(12) United States Patent  
Tanaka

(10) Patent No.: US 9,721,439 B2  
(45) Date of Patent: Aug. 1, 2017

(54) DOCKING DEVICE, TRANSACTION PROCESSING SYSTEM, AND NOTIFICATION METHOD

(71) Applicant: PANASONIC INTELLECTUAL PROPERTY MANAGEMENT CO., LTD., Osaka (JP)

(72) Inventor: Yasuyuki Tanaka, Kanagawa (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 0 days.

(21) Appl. No.: 15/183,965

(22) Filed: Jun. 16, 2016

(65) Prior Publication Data

US 2017/0061746 A1 Mar. 2, 2017

(30) Foreign Application Priority Data

Aug. 31, 2015 (JP) .................................. 2015-171098

(51) Int. Cl.

| | | |
|---|---|---|
| *G06F 17/00* | (2006.01) | |
| *G07G 1/00* | (2006.01) | |
| *G06F 1/16* | (2006.01) | |
| *H01H 13/79* | (2006.01) | |
| *H01H 13/78* | (2006.01) | |

(52) U.S. Cl.  
CPC ......... *G07G 1/0018* (2013.01); *G06F 1/1632* (2013.01); *H01H 13/78* (2013.01); *H01H 13/79* (2013.01); *H01H 2239/032* (2013.01)

(58) Field of Classification Search  
CPC .. H01H 2239/032; H01H 13/78; H01H 13/79; H01H 2205/032; H01H 2225/01; H01H 2227/018; G06F 1/1632

USPC .......................................................... 235/385  
See application file for complete search history.

(56) References Cited

U.S. PATENT DOCUMENTS

2007/0062791 A1* 3/2007 Quinque ................. H01H 3/16  
200/61.43  
2008/0028168 A1 1/2008 Muraoka  
(Continued)

FOREIGN PATENT DOCUMENTS

| JP | 2008-033593 | 2/2008 |
|---|---|---|
| JP | 2012-169119 | 9/2012 |
| JP | 2013-003979 | 1/2013 |

*Primary Examiner* — Claude J Brown  
(74) *Attorney, Agent, or Firm* — Greenblum & Bernstein, P.L.C.

(57) ABSTRACT

There is provided a transaction terminal device including: a housing; a frame panel that is attached to the housing; a plurality of electrodes that is provided on a board disposed within the housing; a switch member that is inserted into a penetrating hole formed in the housing, and includes a conductor which electrically connects the plurality of electrodes and an elastic deformer which maintains an electrically connected state in which the conductor is in contact with the electrodes by urging force due to elastic deformation in a state in which the frame panel is attached to the housing; and a tamper detector that detects tampering through the releasing of the electrically connected state of the plurality of electrodes due to the detachment of the frame panel from the housing. A waterproof portion that prevents water from infiltrating into the penetrating hole is provided at the switch member.

13 Claims, 10 Drawing Sheets

(56) References Cited

U.S. PATENT DOCUMENTS

2011/0031985 A1\* 2/2011 Johnson ................. G06F 21/86
                                                            324/681
2012/0151607 A1\* 6/2012 Chambourov ......... H01H 13/79
                                                            726/34

\* cited by examiner

DOCKING DEVICE, TRANSACTION PROCESSING SYSTEM, AND NOTIFICATION METHOD

BACKGROUND

1. Technical Field

The present disclosure relates to a docking device that is connected to a transaction processing device used to perform at least one procedure of a merchandise registering process and a settlement process in a commercial transaction, a transaction processing system including the docking device, and a notification method.

2. Description of the Related Art

In a transaction terminal device used for cashless settlement using a credit card or a debit card, that is, a mobile settlement terminal, a password is input using an input key, and a cryptographic key used in communication with a settlement center or an IC card is retained in a memory. Thus, it is necessary to detect an attack on the transaction terminal device, that is, tampering, and it is necessary to prevent secret information such as a password or a cryptographic key from being stolen and being illegally used.

As a technology for preventing the secret information from being stolen by such tampering, that is, a technology for securing tamper resistance, according to a technology disclosed in, for example, Japanese Patent Unexamined Publication No. 2012-169119, a tamper detecting switch is provided on a board serving as a security area in which electronic components such as a memory which retains the secret information are disposed, an event in which the board is detached and the security area is unsealed is detected as tampering, and the secret information retained in the memory is removed if the tampering is detected.

However, since a display input panel acquired by combining a touch panel with a liquid crystal panel is provided at the transaction terminal device and secret information such as a card number or a name is input using the display input panel, it is assumed that the information input by the display input panel is stolen. Thus, tamper resistance for preventing the attack on the display input panel is desired. The transaction terminal device which is carried and is operated needs to have waterproof properties for preventing water from infiltrating into the inside of the device.

SUMMARY

An object of the present disclosure is to secure waterproof properties while reducing the size and weight of a transaction terminal device such that portability is not impaired in a case where an event in which an exterior member is detached from a housing is detected as tampering.

According to an exemplary embodiment of the present disclosure, there is provided a transaction terminal device including: a housing; an exterior member that is attached to the housing; a plurality of electrodes that is provided on a board disposed within the housing; a switch member that is inserted into a penetrating hole formed in the housing, and includes a conductor which electrically connects the plurality of electrodes and an elastic deformer which maintains an electrically connected state in which the conductor is in contact with the electrodes by urging force due to elastic deformation in a state in which the exterior member is attached to the housing; and a tamper detector that detects tampering through the releasing of the electrically connected state of the plurality of electrodes due to the detachment of the exterior member from the housing. A waterproof portion that prevents water from infiltrating into the penetrating hole is provided at the switch member.

According to another exemplary embodiment of the present disclosure, there is provided an information input device including: a housing; a display input panel that is disposed at the housing: a frame panel that covers a periphery of the display input panel; a plurality of electrodes that is provided on a board disposed within the housing; a switch member that is inserted into a penetrating hole formed in the housing, and includes a conductor which electrically connects the plurality of electrodes, and an elastic deformer which maintains an electrically connected state in which the conductor is in contact with the electrodes by urging force due to elastic deformation in a state in which the frame panel is attached to the housing; and a tamper detector that detects tampering through the releasing of the electrically connected state of the plurality of electrodes due to the detachment of the frame panel from the housing. A waterproof portion that prevents water from infiltrating into the penetrating hole is provided at the switch member.

According to the present disclosure, a tamper detecting switch includes a switch member and an electrode, and thus, it is possible to detect an event in which an exterior member is detached from a housing as tampering. Since water is prevented from infiltrating into a penetrating hole by a waterproof portion, it is possible to prevent water from infiltrating into the inside of the housing through the penetrating hole. Accordingly, even though the exterior member is not fixed to the housing with a waterproof structure, it is possible to secure waterproof properties.

DETAILED DESCRIPTION

Hereinafter, an exemplary embodiment of the present disclosure will be described with reference to the drawings. Unnecessary detailed description may be omitted. For example, detailed description of well-known matters and redundant description of substantially the same configuration may be omitted. Therefore, it is possible to avoid unnecessary redundancy in the following description, and it is possible to allow those skilled in the art to easily understand the present disclosure. The accompanying drawings and the following description are provided to allow those skilled in the art to sufficiently understand the present disclosure, and are not intended to limit the subject of claims.

Figure 1:
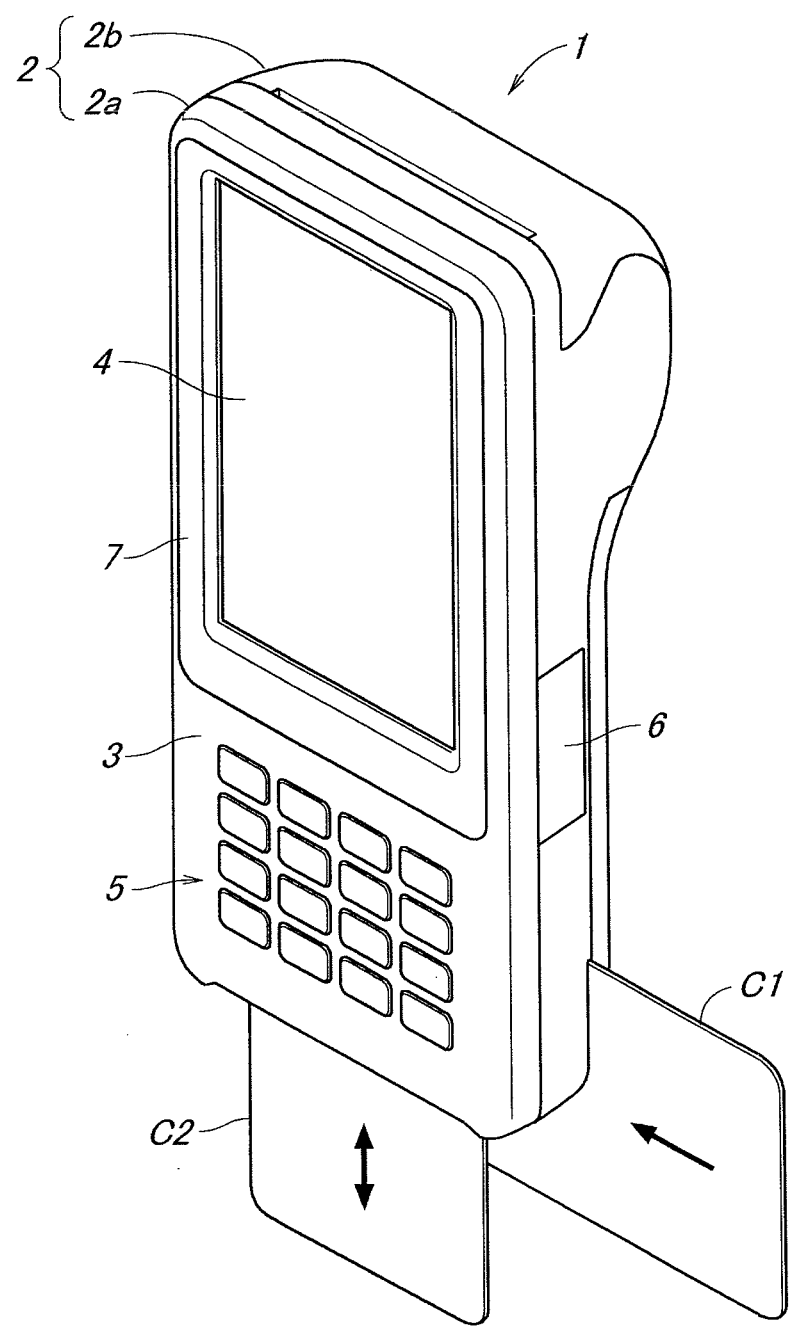
FIG. 1 is a perspective view of a transaction terminal device according to the present exemplary embodiment.
Figure 2:
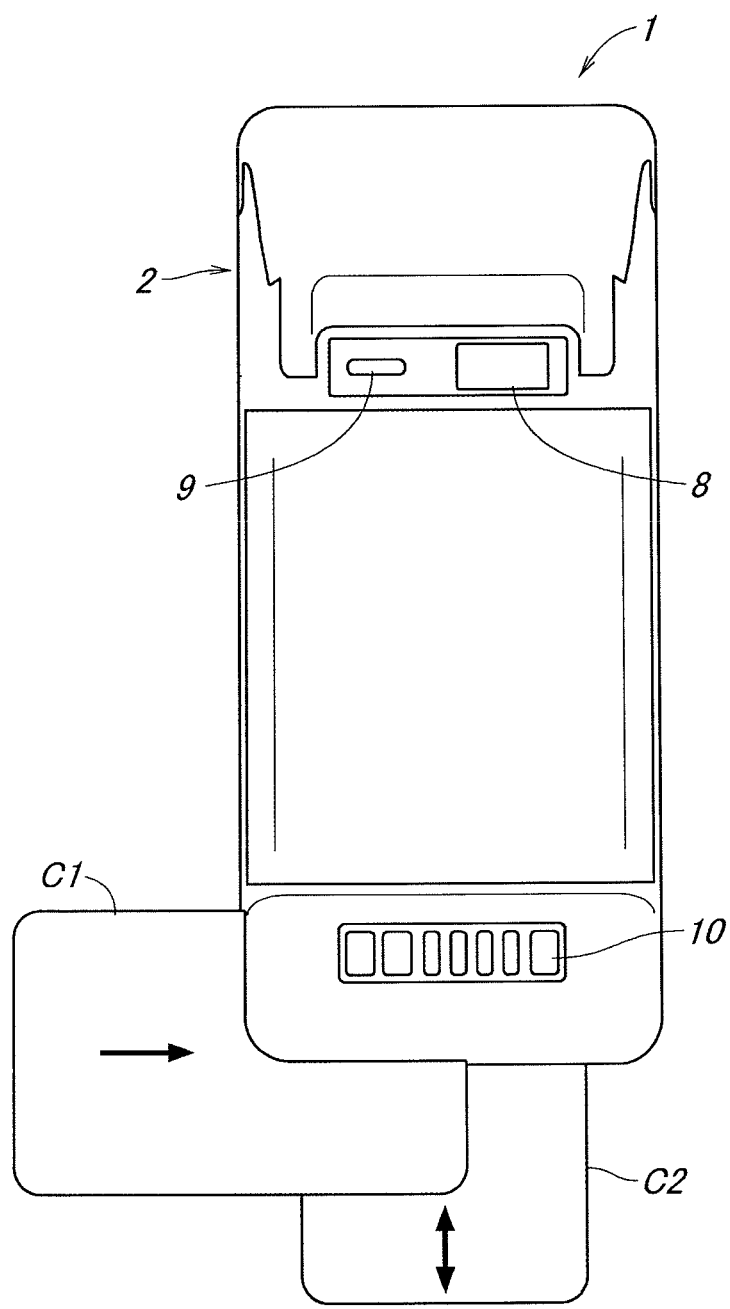
FIG. 2 is a rear view of the transaction terminal device.
Figure 3:
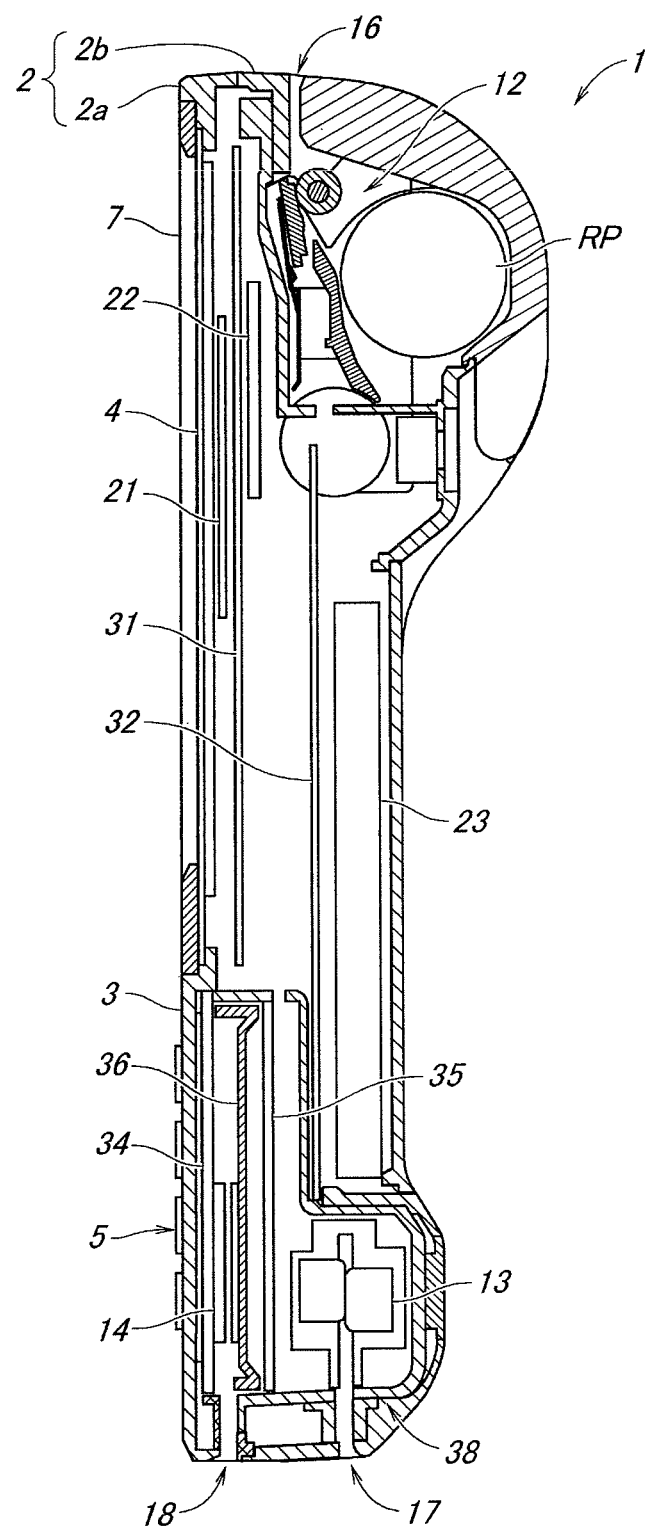
FIG. 3 is a longitudinal sectional view of the transaction terminal device.

FIG. 1 is a perspective view of transaction terminal device 1 according to the present exemplary embodiment. FIG. 2 is a rear view of transaction terminal device 1 shown in FIG. 1. FIG. 3 is a longitudinal sectional view of transaction terminal device 1 shown in FIG. 1.

As shown in FIG. 1, transaction terminal device 1 is a mobile settlement terminal that performs cashless settlement by using magnetic card C1, contact type IC card C2 and a non-contact type IC card (not shown), as a credit card or a debit card. Display input panel 4 and keypad 5 are disposed on front surface 3 of housing 2.

Housing 2 includes upper case 2a and lower case 2b. Display input panel 4 is a so-called touch panel display acquired by combining a liquid crystal display panel with a touch panel. Display input panel 4 is provided such that the periphery thereof is covered with frame panel 7. A plurality of operation keys, specifically, input keys such as a power key, a ten key and a function key are disposed in keypad 5. Cover 6 that covers a power plug and a memory card slot is provided on a side surface of housing 2.

As shown in FIG. 2, camera 8, speaker 9, and connection terminal 10 are provided on a rear surface of housing 2. Camera 8 captures a barcode or the like. Speaker 9 outputs sound such as an alarm sound. Connection terminal 10 is connected to a connection terminal for a cradle (not shown), and supplies power for charging.

As shown in FIG. 3, transaction terminal device 1 includes thermal printer 12, magnetic card reader 13, and contact type IC card reader 14. In printer 12, printing is performed on a recording sheet drawn from roll paper RP acquired by winding the recording sheet in a roll state, and the recording sheet on which the printing has performed is discharged from discharge port 16. Magnetic card reader 13 reads magnetic card C1 inserted into card slot 17 formed in housing 2 (see FIG. 1). Contact type IC card reader 14 reads contact type IC card C2 inserted into card slot 18 formed in housing 2 (see FIG. 1). NFC antenna 21, communication module 22, and battery 23 are provided within housing 2. NFC antenna 21 communicates with the non-contact type IC card having an electronic money function through near field communication (NFC). Communication module 22 wirelessly communicates with a server of a settlement processing system. Battery 23 supplies power to the respective parts of transaction terminal device 1.

As stated above, transaction terminal device 1 performs cashless settlement by using the magnetic card, the contact type IC card or the non-contact type IC card, and can print receipts on which the content of the settlement is recorded. In addition, transaction terminal device 1 may have a function of authenticating a user using the IC card, for example, a function of authenticating a user of transaction terminal device 1.

Main board 31 and sub-board 32 are provided close to a rear surface of display input panel 4 within housing 2. Various types of electronic components for controlling the respective parts of transaction terminal device 1 are mounted on main board 31 and sub-board 32. For example, the liquid crystal display panel and the touch panel of display input panel 4 are connected to main board 31, and the electronic components that control these boards are mounted.

Touch center board 34 and security area main board 35 are disposed close to a rear surface of keypad 5 within housing 2. Boards 34 and 35 and frame member 36 held between boards 34 and 35 are accommodated together with magnetic card reader 13 and contact type IC card reader 14 in module case 37, and serve as security module 38.

A touch sensor that detects an operation of an input key is provided on touch sensor board 34. A memory that stores secret information such as a password or a cryptographic key is mounted on security area main board 35.

A tamper detecting pattern formed by disposing a conducting wire in a wave shape is formed on touch sensor board 34 and security area main board 35. A security sheet on which the tamper detecting pattern is formed adheres to frame member 36 so as to circle the periphery of a space partitioned by touch sensor board 34 and security area main board 35. The security sheet adheres to a proper portion of the inner surface of module case 37. Thus, the electronic components such as the memory mounted on touch sensor board 34 and security area main board 35 and magnetic card reader 13 and contact type IC card reader 14, which are accommodated in module case 37, are protected, and tamper resistance to an attack of stealing secret information can be secured.

The tamper detecting pattern is connected to a tampering detection processor (tamper detector) mounted on security area main board 35, and tampering is detected by the tamper detecting processor.

Transaction terminal device 1 is a so-called thin client, and causes the server of the settlement processing system to perform a main process. Thus, a process related to the reading of the card or a user interface is mainly performed in transaction terminal device 1, a settlement screen is displayed on display input panel 4 based on screen information provided from the server, and secret information such as a card number or a name is input on the settlement screen. Accordingly, it is assumed that the secret information input by display input panel 4 is stolen, and it is necessary to secure tamper resistance related to display input panel 4. Thus, in the present exemplary embodiment, as will be described below, a tamper detecting switch is provided.

Hereinafter, a tamper detecting switch for detecting the event in which frame panel 7 shown in FIG. 1 is detached from housing 2 as tampering will be described. The tamper detecting switch according to the present exemplary embodiment includes a switch member and an electrode. Thus, the tamper detecting switch can detect the event in which frame panel 7 which is a part of an exterior member is detached from housing 2 as tamper, and can prevent water from infiltrating into the inside of housing 2. Accordingly, even though the exterior member is not fixed to the housing with a waterproof structure, it is possible to secure waterproof properties.

Figure 4:
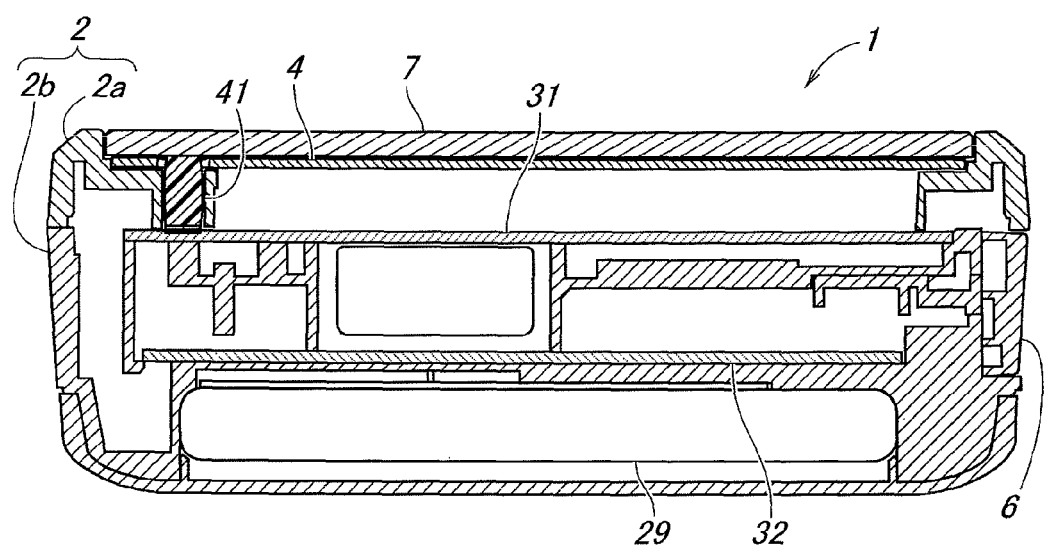
FIG. 4 is a transversal sectional view of the transaction terminal device.
Figure 5:
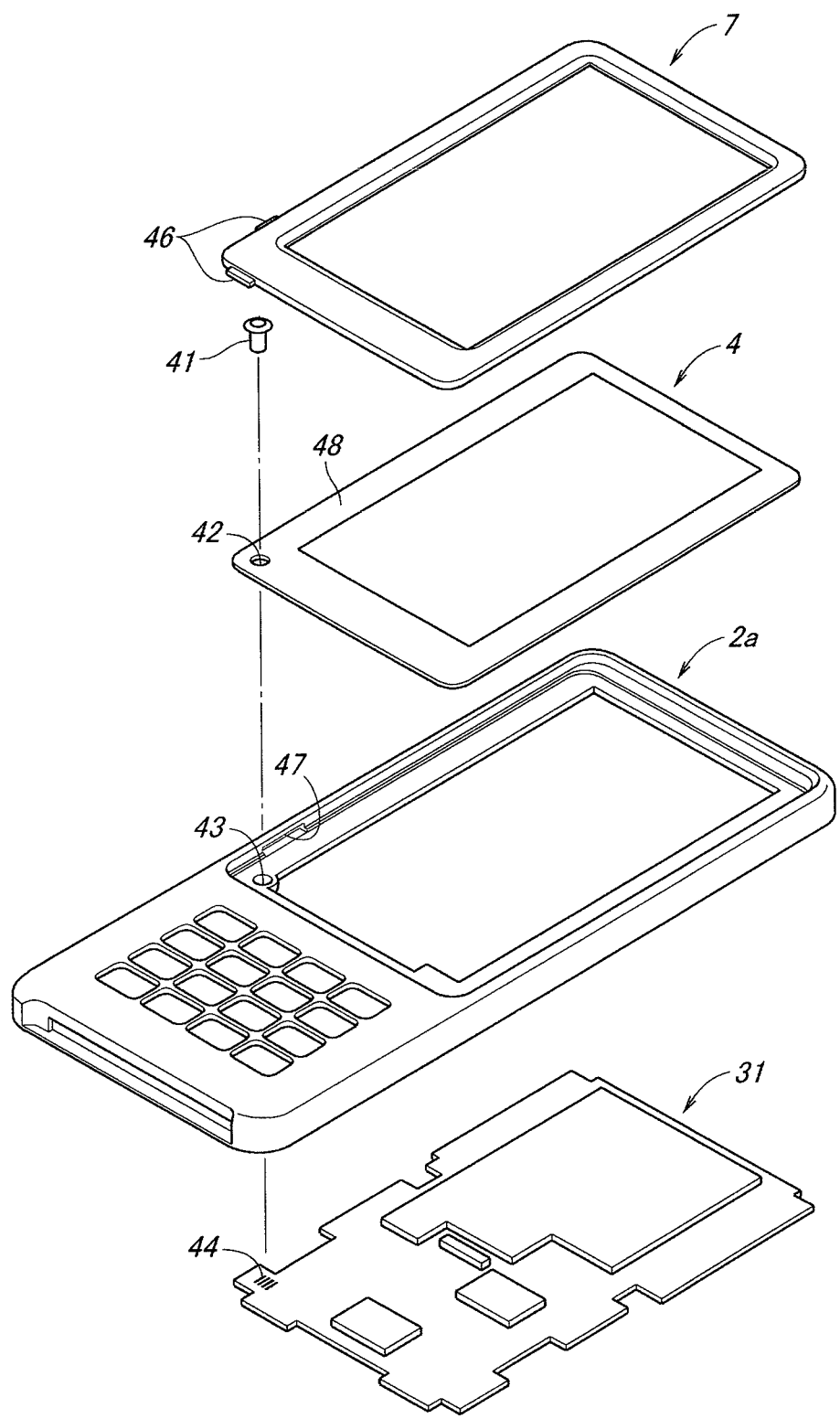
FIG. 5 is an exploded perspective view of main parts of the transaction terminal device.

FIG. 4 is a transversal sectional view of transaction terminal device 1. FIG. 5 is an exploded perspective view of main parts of transaction terminal device 1.

As shown in FIG. 4, display input panel 4 is fixed to upper case 2a while being sandwiched between frame panel 7 and upper case 2a. Main board 31 is disposed at the rear of upper case 2a, and switch member 41 formed of a tamper detecting switch for detecting the event in which frame panel 7 is detached from housing 2 as tampering is sandwiched between main board 31 and frame panel 7

As shown in FIG. 5, a penetrating hole 42 into which switch member 41 is inserted is formed in display input panel 4. Penetrating hole 43 into which switch member 41 is inserted is formed in upper case 2a. Multiple electrodes 44 are provided on main board 31 in positions corresponding to penetrating holes 42 and 43 of display input panel 4 and upper case 2a, and thus, switch member 41 inserted into penetrating holes 42 and 43 can be in contact with electrodes 44. Frame panel 7 and upper case 2a are assembled while inserting switch member 41 into penetrating holes 42 and 43 of display input panel 4 and upper case 2a, and thus, switch member 41 is attached while being pressed by frame panel 7.

Frame panel 7 includes claws 46 formed in the outer periphery thereof and claws 46 are hooked to recess 47 of upper case 2a, so that frame panel 7 is fixed to upper case 2a.

As mentioned above, in order to detect the event in which frame panel 7 covering outer periphery 48 (an area which is not used as at least an input area) of display input panel 4 is detached as tamper, it is necessary to provide switch member 41 of the tamper detecting switch so as to penetrate display input panel 4. However, in an assembled state, since it is assumed that water infiltrates into the inside of upper case 2a through a gap between frame panel 7 and display input panel 4 and penetrating holes 42 and 43 formed in display input panel 4 and upper case 2a, it is necessary to secure waterproof properties.

In this case, it is considered that waterproof double-faced tape is buried in the gap between frame panel 7 and display input panel 4, and thus, waterproof properties are secured. By doing this, in a case where frame panel 7 and upper case 2a are assembled, frame panel 7 and upper case 2a are fixed before frame panel 7 is assembled in a specified position in some cases, and thus, it becomes difficult to assemble. The use of the waterproof double-faced tape is not desirable since a disposal member is generated due to reworking. Meanwhile, it is possible to secure waterproof properties by allowing frame panel 7 to have the waterproof structure and to be fixed to the housing. However, in this case, the number of components and the number of manufacturing steps are increased, so that manufacturing cost is increased and the size of the device becomes larger. Thus, in the present exemplary embodiment, a configuration in which waterproof properties are secured without using the waterproof doubled-faced tape is adopted.

Figure 6:
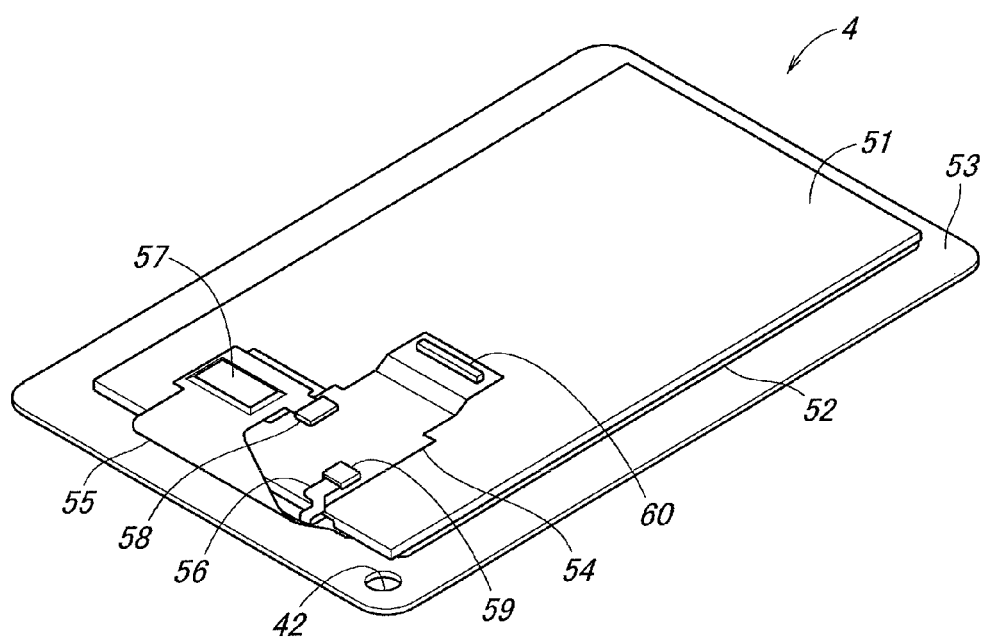
FIG. 6 is a perspective view showing a rear side of a display input panel.

Hereinafter, display input panel 4 shown in FIG. 1 will be described. FIG. 6 is a perspective view showing the rear side of display input panel 4.

Display input panel 4 includes liquid crystal display panel 51, capacitive touch panel 52, and front panel 53 that supports liquid crystal display panel 51 and touch panel 52.

Flexible board 54 extending from liquid crystal display panel 51, flexible board 55 extending from touch panel 52, and power supply cable 56 extending from a backlight within liquid crystal display panel 51 are disposed on the rear surface of display input panel 4. Control circuit 57 that controls touch panel 52 is mounted on flexible board 55. Connector 58 to which flexible board 55 is connected, connector 59 to which power supply cable 56 is connected, and connector 60 to which main board 31 (see FIG. 3) is connected are mounted on flexible board 54.

With such display input panel 4, there is a possibility that information input by touch panel 52 is stolen by detaching frame panel 7 that covers outer periphery 48 of the display input panel, forming a hole in front panel 53 of display input panel 4 and bringing a probe into contact with a terminal of control circuit 57 or wiring of flexible board 55 extending from touch panel 52. Thus, in the present exemplary embodiment, in order to prevent such an attack, the event in which frame panel 7 is detached from housing 2 is detected as tampering.

Figure 7:
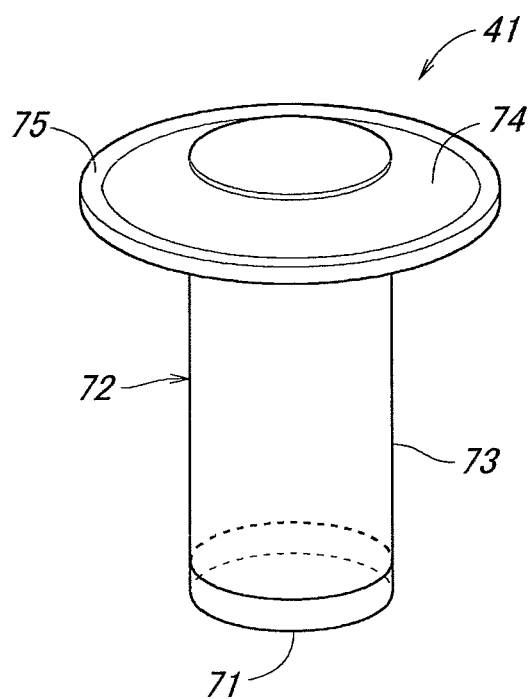
FIG. 7 is a perspective view of a switch member.

Hereinafter, switch member 41 shown in FIG. 4 will be described. FIG. 7 is a perspective view of switch member 41.

Switch member 41 includes conductor 71 made from a conductive material, and an elastic deformer 72 made from a rubber material (elastic material).

Conductor 71 is made from a conductive material, for example, a conductive rubber material (conductive elastic material). Conductor 71 may be formed by adhering a member, which is acquired by forming a conductive material in a predetermined shape or cutting a conductive sheet material in a predetermined shape, to elastic deformer 72, may be integrally formed with elastic deformer 72 using a conductive material, or may be a conductive film formed by applying a conductive paint.

Elastic deformer 72 includes column 73, ring 74 provided near column 73, and rib 75 provided on the periphery of ring 74, and column 73, ring 74 and rib 75 are integrally formed using a rubber material (elastic material). Ring 74 and rib 75 are provided at an end of column 73 on a side opposite to conductor 71. Ring 74 is formed in a bevel shape so as to unfurl toward conductor 71 (see FIG. 9A). In the present exemplary embodiment, rib 75 is formed in a ring shape so as to protrude on a side opposite to conductor 71. Rib 75 may be provided in a ring shape so as to protrude on a side of conductor 71.

Figure 8:
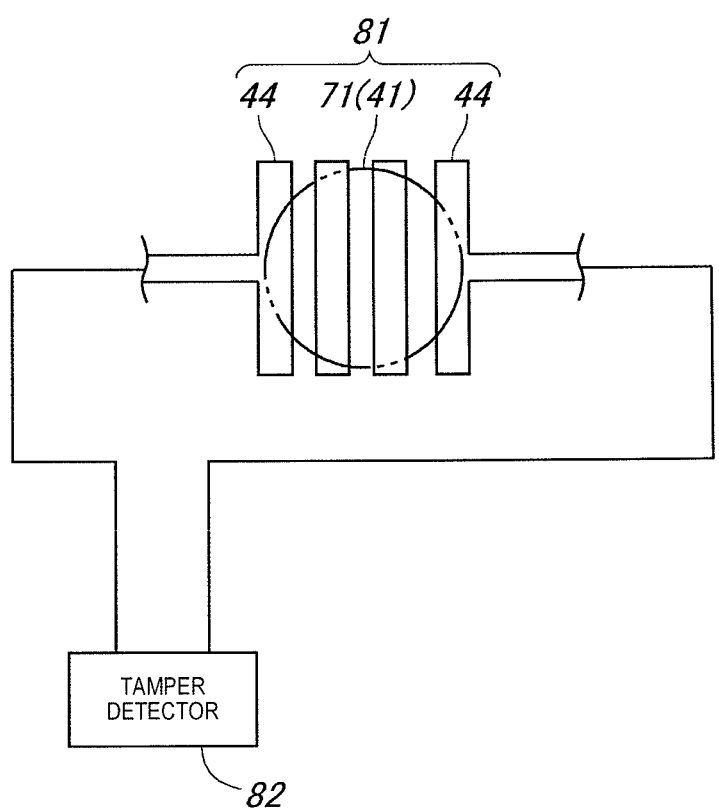
FIG. 8 is an explanatory diagram for describing the outline of tamper detection by a tamper detecting switch.

Hereinafter, the tamper detection performed by tamper detecting switch 81 including electrodes 44 and conductor 71 of switch member 41 shown in FIG. 5 will be described. FIG. 8 is an explanatory diagram for describing the outline of the tamper detection performed by tamper detecting switch 81.

In the present exemplary embodiment, tamper detecting switch 81 includes switch member 41 and multiple electrodes 44 provided on main board 31, electrodes 44 of main board 31 are electrically connected to tamper detector 82, and tamper detector 82 can distinguish between a state in which multiple electrodes 44 are electrically connected by bringing conductor 71 of switch member 41 into contact with multiple electrodes 44 and a state in which the electrically connected state of electrodes 44 is released by separating conductor 71 from multiple electrodes 44.

Accordingly, if frame panel 7 is detached from housing 2 and the electrically connected state of electrodes 44 is released by separating conductor 71 of switch member 41 from multiple electrodes 44, tamper detector 82 can detect the event in which frame panel 7 is detached from housing 2 as tampering.

Tamper detector 82 is a microcomputer, and the microcomputer is mounted on the security area main board and is protected from an attack of unsealing a security area.

Figure 9A:
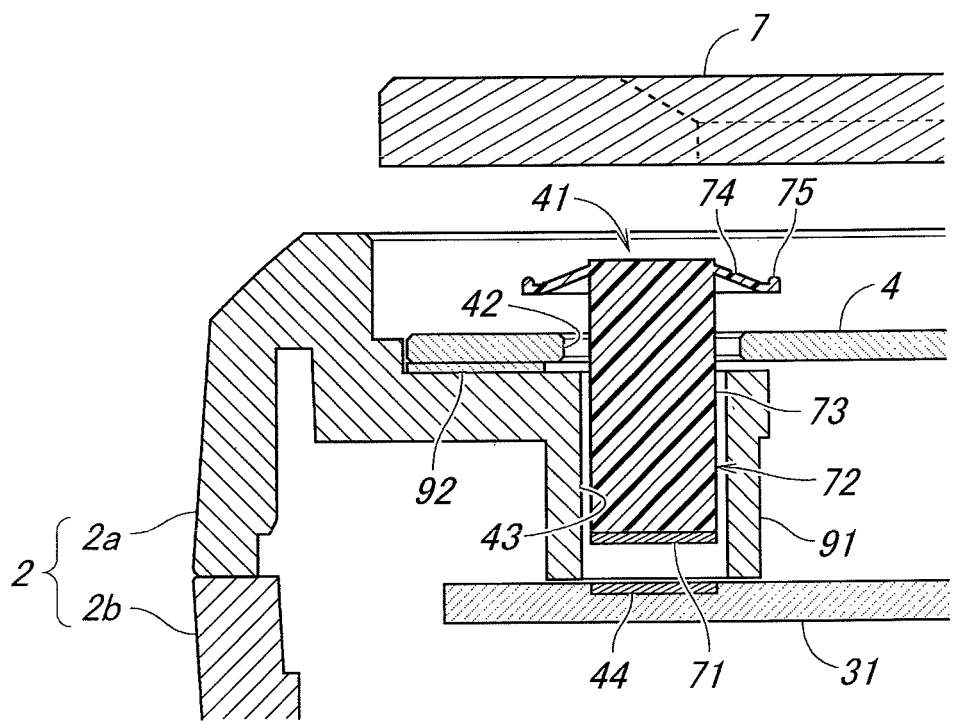
FIGS. 9A and 9B are transversal sectional views of main parts of the transaction terminal device near the switch member.
Figure 9B:
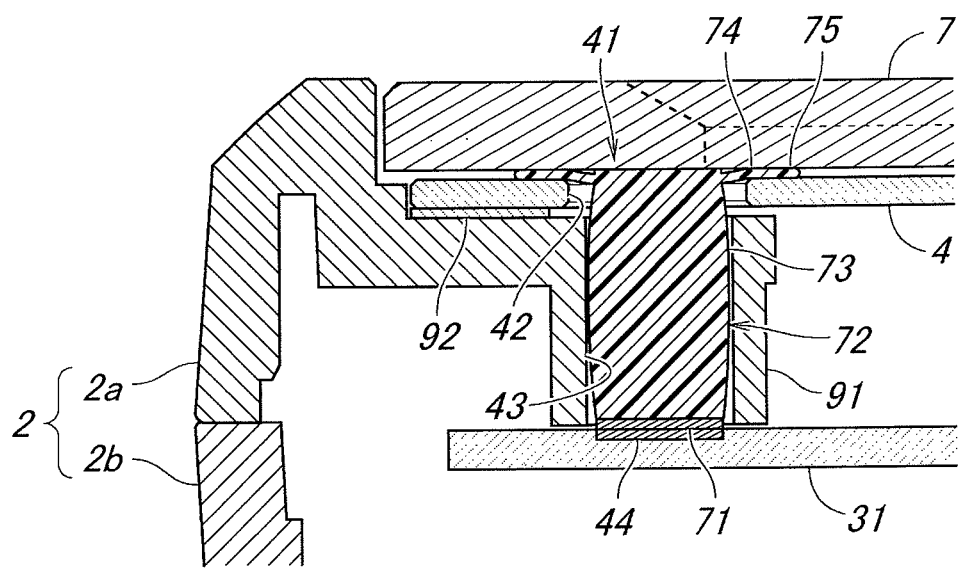

Hereinafter, the assembled state of switch member 41 shown in FIG. 7 will be described. FIGS. 9A and 9B are transversal sectional views of main parts of transaction terminal device 1 near switch member 41.

As shown in FIG. 9A, at the time of assembling, frame panel 7 and upper case 2a are assembled while switch member 41 is inserted into penetrating hole 42 formed in display input panel 4 and penetrating hole 43 formed in upper case 2a. As shown in FIG. 9B, in the assembled state, column 73 of switch member 41 is sandwiched between frame panel 7 and main board 31, and ring 74 and rib 75 are sandwiched between frame panel 7 and display input panel 4.

In an initial state shown in FIG. 9A, column 73 is formed so as to be longer than a gap between frame panel 7 and main board 31 in the assembled state. In the assembled state shown in FIG. 9B, the column is compressed and deformed by being sandwiched between frame panel 7. and main board 31, and maintains an electrically connected state in which conductor 71 is in contact with electrodes 44 by urging force due to the compression and deformation.

Ring 74 is formed in the bevel shape in the initial state shown in FIG. 9A, and is bent in a flat plate shape by being sandwiched between frame panel 7 and display input panel 4 in the assembled state shown in FIG. 9B. Rib 75 is also compressed and deformed by being sandwiched between frame panel 7 and display input panel 4 in the assembled state, and rib 75 is in close contact with frame panel 7 and display input panel 4 due to urging force generated by the compression and deformation. Accordingly, it is possible to secure waterproof properties.

Cylindrical switch-member holder 91 that holds switch member 41 is provided at upper case 2a, and penetrating hole 43 into which switch member 41 is inserted becomes longer by switch-member holder 91. Accordingly, since it is possible to stably hold switch member 41, it is possible to smoothly perform an operation of bringing or separating the conductor into contact with or from electrodes 44 of switch member 41. It is preferable that the diameters of penetrating hole 42 and penetrating hole 43 into which switch member 41 is inserted are formed so as to be greater than the diameter of column 73 of switch member 41.

Display input panel 4 is fixed to upper case 2a by waterproof double-faced tape 92, and water does not infiltrate into the inside of upper case 2a through a gap between display input panel 4 and upper case 2a.

Figure 10A:
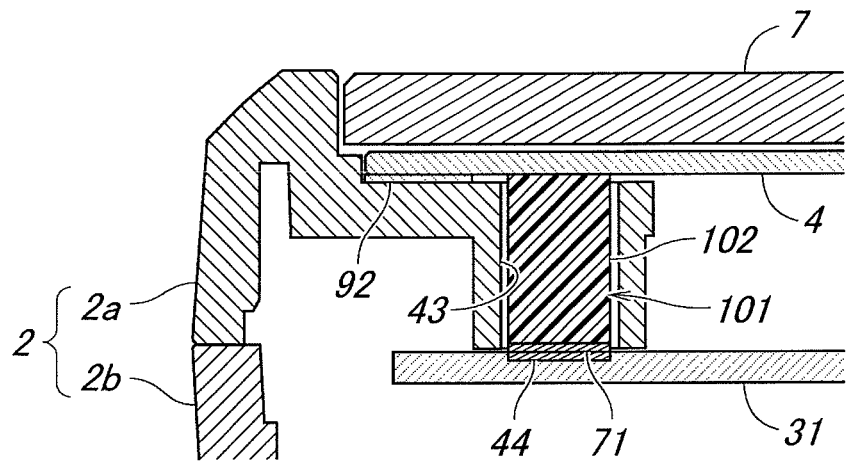
FIGS. 10A to 10C are transversal sectional views of the main parts of the transaction terminal device showing comparative examples of the tamper detecting switch.
Figure 10B:
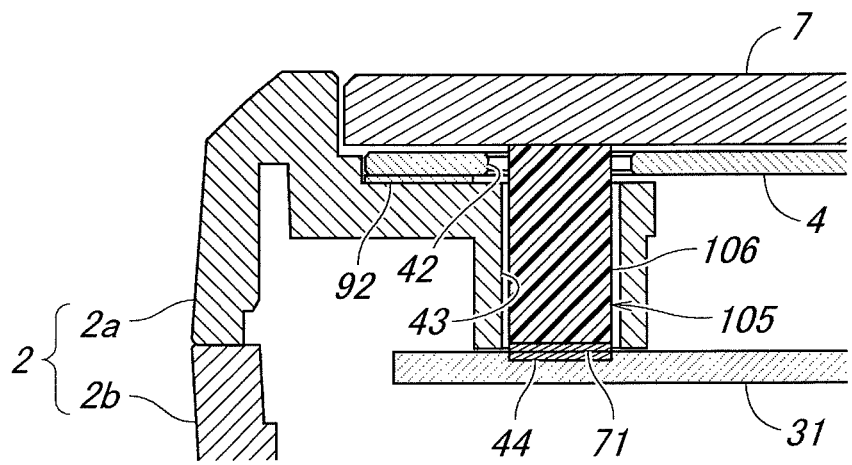
Figure 10C:
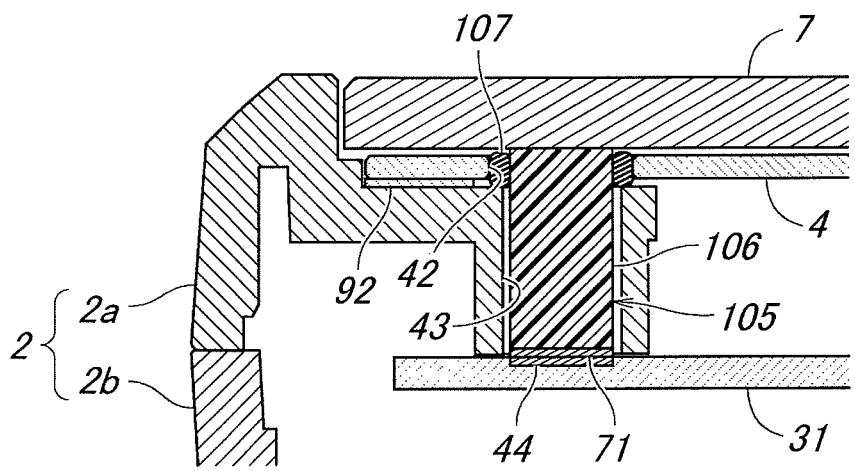

Hereinafter, comparative examples of the tamper detecting switch will be described. FIGS. 10A to 10C are transversal sectional views of main parts of transaction terminal device 1 showing comparative examples of the tamper detecting switch.

In the example shown in FIG. 10A, switch member 101 includes conductor 71 and elastic deformer 102, and is sandwiched between display input panel 4 and main board 31. Since display input panel 4 is fixed to upper case 2a by waterproof double-faced tape 92, water does not infiltrate into the inside of upper case 2a. However, since the event in which display input panel 4 is detached from upper case 2a is detected as tamper, the information input by display input panel 4 may be stolen by detaching frame panel 7, forming the hole in display input panel 4, and bringing the probe into contact with the terminal or wiring at the rear of display input panel 4, and it is not possible to secure tamper resistance.

In the example shown in FIG. 10B, switch member 105 includes conductor 71 and elastic deformer 106, and is sandwiched between frame panel 7 and main board 31. In this case, since the event in which frame panel 7 is detached from upper case 2a can be detected as tamper, it is possible to secure tamper resistance. However, since penetrating hole 42 into which switch member 105 is inserted is formed in display input panel 4, there is a concern that water infiltrates into the inside of upper case 2a through penetrating hole 42, so that it is not possible to secure waterproof properties.

In the example shown in FIG. 10C, sealing member 107 is attached between switch member 105 and penetrating hole 42 of display input panel 4. In this case, since water is prevented from infiltrating into the inside of upper case 2a through penetrating hole 42 by sealing member 107, it is possible to secure waterproof properties. However, since the movement of switch member 105 is restricted by sealing member 107, even though frame panel 7 is detached, conductor 71 of switch member 105 is not immediately separated from electrodes 44, and thus, it is not possible to detect the tamper in some cases. Thus, the tamper resistance is degraded.

Unlike such comparative examples, in the present exemplary embodiment, since rib 75 of switch member 41 is provided so as to close the passage of water on the outside of penetrating hole 42 of display input panel 4 as shown in FIGS. 9A and 9B, particularly, the rib is provided so as to cover an outer surface opened by penetrating hole 42 in display input panel 4, the movement of switch member 41 is not restricted. Thus, it is possible to smoothly perform the operation of separating conductor 71 of switch member 41 from electrodes 44 in response to the detachment of frame panel 7. Accordingly, it is possible to reliably detect that frame panel 7 is detached.

Although the present disclosure has been described based on the specific exemplary embodiment, the exemplary embodiment is merely an example, and the present disclosure is not limited by the exemplary embodiment. All the respective components of the transaction terminal device and the information input device according to the present disclosure described in the aforementioned exemplary embodiment are not necessary, and may be appropriately selected without departing from at least the scope of the present disclosure.

For example, although it has been described in the aforementioned exemplary embodiment that the mobile settlement terminal that performs the cashless settlement using the magnetic card or the contact type IC card is used as an example of the transaction terminal device, the transaction terminal device according to the present disclosure is not limited to the purpose of settlement. In addition to the transaction terminal device, a dedicated device to input a personal identification number (PIN) such as a password, that is, an information input device such as a PIN pad, may be used.

Although it has been described in the aforementioned exemplary embodiment that the detachment of the frame panel as the exterior member is detected as the tampering, the exterior member according to the present disclosure is not limited to such a frame panel. Although it has been described that the penetrating hole is formed in the display input panel sandwiched between the frame panel as the exterior member and the housing and the switch member is inserted into the penetrating hole, the present disclosure is not limited to the configuration in which a separate member is sandwiched between the exterior member and the housing, and may be applied to a case where there is no member sandwiched between the exterior member and the housing.

Although it has been described in the aforementioned exemplary embodiment that the bevel and the rib as a waterproof portion of the switch member are integrally formed with the column by using the rubber member, the bevel and the rib may be individually formed, and may be bonded.

What is claimed is:
1. A transaction terminal device, comprising:
a housing having a penetrating hole that penetrates completely through the housing;
an exterior member that is attached to the housing;
a plurality of electrodes that is provided on a board disposed within the housing;
a switch member that includes a conductor that electrically connects the plurality of electrodes and an elastic deformer, which maintains an electrically connected state in which the conductor is in contact with the electrodes by urging force based on elastic deformation, and a tamper detector that detects tampering through a releasing of the electrically connected state of the plurality of electrodes when the exterior member is detached from the housing,
wherein a waterproof portion is provided at the switch member, the waterproof portion forming a waterproof seal that prevents water from infiltrating into the penetrating hole.

2. The transaction terminal device of claim 1, further comprising:
a display input panel,
wherein the exterior member is a frame panel that covers a periphery of the display input panel, and
the switch member is inserted into a penetrating hole formed in the periphery of the display input panel and the penetrating hole formed in the housing.

3. The transaction terminal device of claim 1,
wherein the elastic deformer includes
a column,
a ring that is provided near the column, and
a rib that serves as the waterproof portion provided in a periphery of the ring,
wherein the column, the ring and the rib are integrally formed using an elastic material,
the column is sandwiched between the exterior member and the board, and
the ring and the rib are sandwiched between the exterior member and the housing, in the attached state of the exterior member.

4. The transaction terminal device of claim 1,
wherein the switch member further includes a rib positioned at an opposite end of the conductor, the rib having a diameter larger than a diameter of the penetrating hole.

5. An information input device comprising:
a housing having a penetrating hole that penetrates completely through the housing;
a display input panel that is disposed at the housing:
a frame panel that covers a periphery of the display input panel;
a plurality of electrodes that is provided on a board disposed within the housing;
a switch member that includes a conductor that electrically connects the plurality of electrodes, and an elastic deformer which maintains an electrically connected state in which the conductor is in contact with the electrodes by urging force based on elastic deformation, and
a tamper detector that detects tampering through a releasing of the electrically connected state of the plurality of electrodes due to a detachment of the frame panel from the housing,
wherein a waterproof portion is provided at the switch member, the waterproof portion forming a waterproof seal that prevents water from infiltrating into the penetrating hole.

6. A transaction terminal device, comprising:
a first housing having a hole that penetrates completely through the housing;
a second housing disposed on the first housing;
an electrode that is disposed on a circuit board within the first housing; and
a switch member that is positioned between the second housing and the circuit board, and includes an elastic member and a conductor connected to the electrode on the circuit board,
wherein the elastic member further includes a first portion of which at least part is inserted into the hole and of which a first end is attached to the conductor, and a second portion extended around from a second end of the first portion,
wherein in a state where the elastic member is not compressed, the switch member is longer than a distance between the second housing and the circuit board, and
wherein in a state where the elastic member is compressed by the second housing and the circuit board, the second portion blocks an opening of the hole.

7. The transaction terminal device of claim 6,
wherein in a state where the elastic member is not compressed, the switch member is longer than a depth of the hole.

8. The transaction terminal device of claim 6,
wherein an outer periphery of the second portion is greater than an outer periphery of the opening of the hole.

9. The transaction terminal device of claim 6, further comprising:
a frame having a hole that penetrates completely through the frame; and
a display input panel that is positioned within the frame,
wherein both the frame and the display input panel are positioned between the first housing and the second housing, and
wherein the first portion of the switch member is inserted into both the hole of the first housing and the hole of the frame.

10. The transaction terminal device of claim 9,
wherein the second portion of the switch member is positioned between the second housing and the frame.

11. The transaction terminal device of claim 9,
wherein an opening of the hole of the frame is larger than the opening of the hole of the first housing, and an outer periphery of the second portion is greater than an outer periphery of the opening of the hole of the frame.

12. The transaction terminal device of claim 9,
wherein a depth of the hole of the first housing is greater than a depth of the hole of the first housing.

13. The transaction terminal device of claim 6, further comprising:
a tamper detector that detects a state where the conductor of the switch member is not connected to the electrode.

* * * * *